United States Patent
Pan et al.

(10) Patent No.: US 7,512,941 B2
(45) Date of Patent: Mar. 31, 2009

(54) METHOD AND SYSTEM FOR DISTRIBUTING AND UPDATING HETEROGENEOUS RESOURCES

(75) Inventors: Yue Pan, Beijung (CN); Lei Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 10/841,598

(22) Filed: May 7, 2004

(65) Prior Publication Data

US 2005/0160063 A1    Jul. 21, 2005

(30) Foreign Application Priority Data

May 16, 2003    (CN)    ............... 03 1 31176.8

(51) Int. Cl.
  *G06F 9/44*    (2006.01)
  *G06F 17/30*    (2006.01)
(52) U.S. Cl. .................. 717/173; 717/170; 707/201
(58) Field of Classification Search .................. None
  See application file for complete search history.

(56) References Cited

U.S. PATENT DOCUMENTS

| | | | |
|---|---|---|---|
| 5,875,443 A * | 2/1999 | Nielsen ................ | 707/2 |
| 6,021,426 A | 2/2000 | Douglis et al. ........... | 709/200 |
| 6,182,117 B1 | 1/2001 | Christie et al. .......... | 709/205 |
| 6,272,536 B1 | 8/2001 | VanHoff et al. .......... | 709/217 |
| 6,282,508 B1 * | 8/2001 | Kimura et al. ............ | 704/10 |
| 6,295,541 B1 * | 9/2001 | Bodnar et al. ............ | 707/203 |
| 6,345,245 B1 * | 2/2002 | Sugiyama et al. ......... | 704/10 |

* cited by examiner

*Primary Examiner*—Michael J Yigdall
(74) *Attorney, Agent, or Firm*—Scully, Scott, Murphy & Presser, P.C.

(57) ABSTRACT

Methods, systems and apparatus for distributing and updating resources. An example method comprising the steps of: a resource producer registering a resource and a resource plug-in with a first server, and submitting a resource patch thereto when a resource update occurs; a second server replicating the resource, the resource plug-in and the resource patch from the first server, and a resource consumer downloading the resource, the resource plug-in and the resource patch from the second server; and updating the resource at the resource consumer side by executing the resource plug-in to apply the resource patch on the resource, and obtaining an updated resource version. The method and system of the present invention will greatly save network bandwidth in a large scale progressive resource distribution and make the design more flexible and extensible.

24 Claims, 6 Drawing Sheets

METHOD AND SYSTEM FOR DISTRIBUTING AND UPDATING HETEROGENEOUS RESOURCES

TECHNICAL FIELD

The present invention is directed to a method and system for distributing and updating heterogeneous resources. It is more particularly directed to methods, apparatus and systems for distributing, versioning and accessing, in large scale, evolving heterogeneous resources in a distributed computing environment.

BACKGROUND

The resources in the present application are digital data that is used frequently, relative static but still evolving, e.g. a dictionary, a catalog, a name list, a directory, etc. An enterprise may have various resources used by different computing systems, and these resources are copied and distributed so that they can be rapidly retrieved on local computers. For example, a large enterprise may need to maintain a dictionary of frequently used terms in its business. The dictionary needs to be distributed to all the employee's computers so that the spell-checker software can correctly recognize these terms. The dictionary is an evolving resource, which is updated in a low frequency, e.g. weekly or monthly. This enterprise may also want to have versioning control on the dictionary. At the same time, the same enterprise may maintain a standard computer system configuration information. The configuration information needs to be distributed to all the employee's computers so that all the computers' configuration are correct and comply with the enterprise's policies. The configuration information is also an evolving resource. Currently each evolving resource has its own distribution channels, either online or offline, and has an extra development, deployment, and maintenance cost.

U.S. Pat. No. 6,405,219 discloses a method and system for automatically updating the version of a set of files stored in content servers, but it transfers the entire files over the network for replication, and this will occupy a lot of network bandwidth.

U.S. Pat. No. 6,272,536 discloses a system and method for the distribution of codes and data. It describes a system and method for distributing software applications and data to many thousands of clients over a network. The US patent's technical solution does not have any intermediate servers for the distribution, and therefore can not share the load of a server, making users unable to be distributed quickly with codes and data. In addition, this US patent can only distinguish old and new versions so as to conduct a linear version management, and can not support an entire resource versioning tree structure.

U.S. Pat. No. 6,182,117 discloses a method and apparatus for workgroup information replication. The apparatus provides an ability to use an existing store-and-forward messaging network such as an electronic mail system to replicate data between computer sites. In the technical solution of this US patent, changes to existing objects/resources are treated as new objects, but this does not facilitate the tracking of the update of particular objects/resources.

In the above mentioned conventional techniques, there are defects that the occupied channel bandwidth is excessive, the costs for development, deployment and maintenance are higher, the ability for controlling version updates is weaker, and the replicating of resource patches and the controlling of version updates can not be integrated.

SUMMARY OF THE INVENTION

In order to solve the above problems, an aspect of the present invention is to provide methods, systems and apparatus for distributing and updating resources, enabling dispersing the loads on a server and a network for distributing resources, and thus speeding up the distribution speed.

Another aspect of the present invention is to provide methods and apparatus for distributing and updating resources, capable of classifying resource versions according to a tree structure, performing finer control, thus lessening the loads on a server and a network and speeding up resource distribution.

In order to achieve the above aspects, the present invention provides an universal method and apparatus for distributing, versioning and accessing a plurality of progressive evolving heterogeneous resources. In an example embodiment, a method for distributing and updating resources, comprises the steps of: a resource producer registering a resource and a resource plug-in with a first server, and submitting a resource patch thereto when a resource update occurs; a second server replicating the resource, the resource plug-in and the resource patch from the first server, and a resource consumer downloading the resource, the resource plug-in and the resource patch from the second server; and updating the resource at the resource consumer side by executing the resource plug-in to apply the resource patch on the resource, and obtaining an updated resource version.

The present invention also provides an example of a method for distributing and updating heterogeneous resources, comprising the steps of: a resource producer registering a resource and a resource plug-in with a first server, and submitting a resource patch thereto; the first server storing the resource, the resource plug-in and the resource patch therein; a second sever replicating the resource, the resource plug-in and the resource patch from the first sever; if there is not the needed resource and the corresponding resource plug-in at a resource consumer side, the resource consumer requesting the second server for the resource, resource plug-in and resource patch, and downloading them; applying the received resource patch on the resource by executing the resource plug-in, so as to obtain the updated resource; and at the resource consumer side, storing the updated resource as the latest revision for the use of the resource consumer.

BRIEF DESCRIPTION OF THE DRAWINGS

The foregoing and other features, utilities and advantages of the invention will be apparent from the following more particular description of various embodiments of the invention as illustrated in the accompanying drawings, in which.

DETAILED DESCRIPTION OF THE INVENTION

Figure 1:
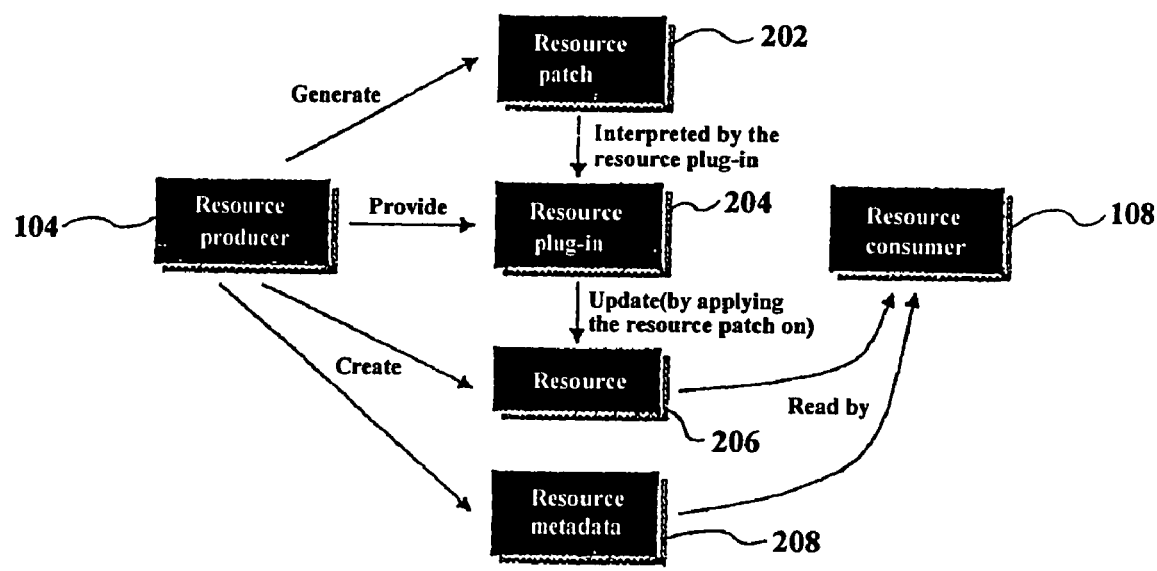
FIG. 1 is a schematic diagram showing relationships among a resource, a resource patch, a resource plug-in, resource metadata, a resource producer and a resource consumer.

The present invention provides methods, systems and apparatus for distributing and updating resources, enabling dispersing the loads on a server and a network for distributing resources, and thus speeding up the distribution speed. It shows examples of a method and apparatus for distributing and updating resources, capable of classifying resource versions according to a tree structure, performing finer control, thus lessening the loads on a server and a network and speeding up resource distribution. Also provided is an universal method and apparatus for distributing, versioning and accessing a plurality of progressive evolving heterogeneous resources.

In an example embodiment, the present invention provides a method for distributing and updating resources, comprising the steps of: a resource producer registering a resource and a resource plug-in with a first server, and submitting a resource patch thereto when a resource update occurs; a second server replicating the resource, the resource plug-in and the resource patch from the first server, and a resource consumer downloading the resource, the resource plug-in and the resource patch from the second server; and updating the resource at the resource consumer side by executing the resource plug-in to apply the resource patch on the resource, and obtaining an updated resource version.

In an example embodiment, the present invention also provides a method for distributing and updating heterogeneous resources, comprising the steps of: a resource producer registering a resource and a resource plug-in with a first server, and submitting a resource patch thereto; the first server storing the resource, the resource plug-in and the resource patch therein; a second sever replicating the resource, the resource plug-in and the resource patch from the first sever; if there is not the needed resource and the corresponding resource plug-in at a resource consumer side, the resource consumer requesting the second server for the resource, resource plug-in and resource patch, and downloading them; applying the received resource patch on the resource by executing the resource plug-in, so as to obtain the updated resource; and at the resource consumer side, storing the updated resource as the latest revision for the use of the resource consumer.

In an example embodiment, the present invention also provides a system for distributing and updating resources, comprising: a first programming interface module for generating, by a resource producer, a resource and a resource plug-in, and when a resource update occurs, generating a resource patch; a second programming interface module for updating the resource by executing the resource plug-in to apply the resource patch to the resource by a resource consumer, so as to obtain an updated resource version; and a replication subsystem for receiving the resource, the resource plug-in and the resource patch from the first programming interface module, storing them and providing them to the second programming interface module.

In some embodiments, the above replication subsystem further comprises: a first server for receiving the resource, the resource plug-in and the resource patch from the first programming interface module, and storing them; and a second server for replicating the resource, the resource plug-in and the resource patch from the first programming interface module, storing them and providing them to the second programming interface module.

Advantages of the Present Invention Include:

(1) The resource plug-in implements the update of data/resources by using an incremental updating algorithm and applying the resource patch on the resource, therefore only a small quantity of resource patches need to be transmitted over a network. This will greatly save network bandwidth in a large scale progressive resource distribution.

(2) The present invention can perform a finer control on the version update of the resource by integrating effectively the replication of the resource patch and the control of version update, i.e., by classifying resources according to the category of the resources and generating a resource patch with respect to each classified resource version. Thus for a minute update change, only a smaller resource patch can solve the problem without performing a complete process and transmission of the entire resource.

Hereinafter, an example of an RDVA (resource distributing, version updating and accessing) system for solving the technical problem of the present invention so as to achieve its technical effects is described in detail. First, each concept and component in the RDVA system of the present invention will be described in conjunction with FIGS. 1 and 2.

FIG. 1 is a schematic diagram showing a relationship among a resource, a resource patch, a resource plug-in, resource metadata, a resource producer and a resource consumer. In FIG. 1, the resource 206 indicates digital data that are used frequently, relative static but still evolving, e.g. dictionaries, name lists, directories, and telephone number books, etc. Every evolution of the resource 206 is implemented by the evolving update of the resource patch 202, and is denoted by revision. Every resource update (revision) by the resource patch 202 creates a new resource revision.

The resource 206 can be generated and updated by the resource producer 104. Different resources 206 have different formats, while the RDVA system of the present invention only treats the resource 206 as a binary object without knowing its internal structure. Therefore, in the present invention, the resource 206 can be any form of data, i.e. heterogeneous resources. For example, a dictionary resource can be illustrated as follows:

Ask<<[STOCK TERM]<<[EXPLANATION] The price at which someone who owns a security offers to sell it; also known as the asked price (See also "Best Ask").

Assets<<[STOCK TERM]<<[EXPLANATION]Any possessions that has value in an exchange.

The above two items are the explanations for stock terms "ask" and "assets" in the dictionary resource, in which "ask" and "assets" are referred to as term strings, while for a directory, for example, its resource format will be different, for example:

Person A<<Office Number]60001000<<[Mobile Phone Number]139 . . .

<<[Office Address] Beijing China.

The above item is the record of the office phone number, mobile phone number and office address of Person A. It can be seen that the resource format of the above directory is different from that of the dictionary. The resource producer 104 indicates a computer program, or people and apparatus, which generate the resource 206, and further update the resource 206. The resource consumer 108 indicates a computer program or people and a device that applies the resource to process data (for example: marking up the keywords in text) or complete specific task (dialing up the computer network). The resource consumer 108 can read the resource 206 prepared by The RDVA system, but it can not write and/or update the resource 206 and can only utilize it. The resource patch 202 is a resource update unit that denotes adding, deleting or changing a part of the resource data. The resource patch 202 is the basic unit for The RDVA system to track, record and update. The format of the resource patch is for example illustrated as follows:

```
D!HTML<<[ABBREVIATION IT TERM]
    A!HTML<<[ABBREVIATION IT TERM]<<[FULL NAME]
    Hyper Text Markup Language <<[WEB SITE]
    http://www.w3.org/MarkUp/ <<[EXPLANATION]
```

The standard markup language for designing Web pages, Markup tags, or formatting commands, allows the Web page designer to specify highlighting, position graphics, create hyperlinks, etc. In the above example, the record beginning with D! indicates deleting the record, the record beginning with A! indicates adding the record. That is, in the above example, the first line indicates deleting an initial item "HTML" in "abbreviation IT term" and adding an amended item "HTML" therein. In addition, in the above example of the resource 206 and the resource patch 202, the contents in "[ ]" is a "class string" for identifying the contents of the item, which corresponds to a respective class number (not shown). The class number is an integer for indicating the class of the term corresponding to the contents of the item.

The resource patch 202 includes the resource metadata 208 for identifying the change of the resource. The resource patch 202 is related to a resource version, and has a corresponding version number in which one resource version represents one update of the resource 206. Different resources 206 have different patch formats and different incremental update algorithms. The RDVA system of the present invention also remains agnostic about the format and contents of the resource patch 202, and treats it as a binary object.

The resource metadata 208 (or resource properties) are a key-value associated with the resource 206, identify the changed data in the resource 206, and also include such ID data (not shown) of the resource 206 as revision time, version number, writer and etc. Because the present invention intentionally separates the resource patch 202 from the resource 206 to identify the changed part of the resource 206, the resource 206 can be updated only through replicating the changed part of the resource 206, i.e. replicating only metadata 208, by the replication subsystem 100.

The resource plug-in (program) 204 indicates a computer program that implements a programming interface and is able to apply the resource patch 202 on an existing resource 206, and generate a new resource. Particularly, each of the resource plug-in 204 and the resource patch 202 is one kind of the resource 206, and is treated as a special kind of resource. The resource 206 and its resource patch 202 are managed in a revision tree manner (described in detail later). In the course of resource updating, the resource plug-in 204 interprets the resource patch 202 and applies an incremental update algorithm. The resource plug-in 204 must be provided by the resource producer 104 when the resource 206 is first created in the RDVA system. The relationship therebetween is shown in FIG. 1 more clearly.

The resource plug-in 204 is a software module that must conform to the RDVA's ResourcePlugin interface. For example, the resource plug-in 204 must implement the following Java interface:

```
public interface ResourcePlugin{
/**
    *Apply a patch on a resource and return the result.
    *@param res the resource instance
    *@param delta the patch instance
    *@param MakeNewRes whether to create a new resource to store the
    final result or just change the original resource<code>res</code>.
    *@return the newly created resource or the changed original resource
    as the result of applying the patch.
    */
    public Resource applyPatch(Resource res, Patch delta, Boolean
        madeNewRes) throws IOException, TARRException;
}
```

The above only provides an interface program of the resource plug-in. In the above interface program, the "applyPatch" indicates a function for computing a new resource, the "res" indicates an instance of a resource, the "delta" indicates the change of a resource, i.e. an instance of a patch, and the "madeNewRes" indicates an incremental update algorithm that applies the "delta" data to the "res", in which the "res" and "delta" represent different types of resource and patch, respectively.

For different types of resources and patches, the specific programs of the plug-in 204 are different. The resource and patch provided in the "applyPatch" method are only the type of the resource 206 and the patch 202 that can be handled by a specific plug-in 204, and the plug-in does not need to handle the type of resource that it does not care. That is, there are two types of resources, "a dictionary" and "a product catalogue" for example, then the resource plug-ins for processing these two types of resources are different. The plug-in for processing the resource "dictionary" can only process the "dictionary" and can not handle the "product catalogue" that it does not care. Likewise, the plug-in for processing the resource "product catalogue" can only process "product catalogue", and can not handle the "dictionary" that it does not care.

For example, for a dictionary resource, the resource plug-in 204 can be implemented as follows:

```
{
File resFile=((SimpleDictionaryResouce)res).get SimpleDictionaryFile( );
if (resFile==null) return null;
{FiledetlaFile=
((SimpleDictionaryResouce)detla).getSimpleDictionaryFile( );
if (detlaFile==null) return null;
SimpleDictionaryFile dicFile=new SimpleDictionaryFile( );
DicFile.load(resFile);
DicFile.applyPatch(detlaFile);
DicFile.save(resFile);
return res;
}
```

According to one embodiment of the present invention, in case that old resource data and its patch are given, the resource plug-in 204 must implement the "applyPatch" method (i.e. incremental update algorithm) for computing new resource data by the above DicFile.applyPatch (detlaFile). When needing to compute new resource data according to an old revision and a patch, the RDVA system of the present invention will call the above method.

The incremental update algorithms of the present invention are algorithms that compute the resource 206 according to its the change to generate new resource data. These algorithms in the prior art are all well known, and can be applied directly to the present invention.

Hereinafter an incremental update algorithm of the present invention will be described by way of an example. For the above-mentioned dictionary, the applyPatch initializes a "deleting record" list and a "adding record" list (i.e. applying a certain amount of internal memory for the "deleting record" list and the "adding record" list), then reads a line in a patch file (i.e. a piece of record). If the beginning tag of the line in the patch file is "D!" or "d!", then a term string (i.e. the term explained in the dictionary resource) and a term type string contained in the line are read, the type number corresponding to the term type string is found, the term string and the type number are combined into one string which is to be added into the "deleting record" list. Otherwise, the beginning tag of the line is "A!" or "a!", then a term string and a term type string contained in the line are read, the type number corresponding to the term type string is found, the term string and the type number are combined into one string which is to be added into the "adding record" list.

Then, the applypatch applies for a new cache pool for storing the amended binary resource file. Next, each piece of record of the binary resource file read into the internal memory previously is scanned, and the term string and the type number of a piece of record are read. If the term string and the type number contained in the record have been included in the "deleting record" list, then the record is skipped (that is, the record are not written into the cache pool, i.e., the record no longer exist in the amended resource file); otherwise, if the term string and the type number contained in the record have been included in the "adding record" list, then the record is skipped (the record will be replaced in the following steps); otherwise, if the term string and the type number contained in the record have been included in neither the "deleting record" list nor the "adding record" list, then the record is written into the cache pool (i.e., the non-amended records in the binary resource file are all read into the cache pool).

Then, the applyPatch scans the "adding record" list, reads a piece of record and writes it into the cache pool (to replace the record, the term string and the type number of which have been included in the "adding record" in the binary resource file). Next, a pointer in the internal memory, which points to the initial binary resource file, is changed to point to the new cache pool. Thus an amended binary resource file is obtained.

In the present invention, a Compile function in the resource plug-in 204 is used to compile the resource file into a binary file, and the applyPatch function amends directly the binary file according to the records to be deleted or to added in the dictionary resource patch. Thus, different resources 206 and patches 202 can have different formats, and the RDVA system of the present invention only treat the resource 206 and the patch 202 as a binary object without knowing its internal structure. Therefore, in the present invention, the resource 206 and the patch 202 can be any form of data. The compiling function Compile is illustrated as follows:

```
/**
*compile a source into binary dictionary
*@param source the source
*/
public void compile(File source){
}
```

Since the method for compiling a resource file into a binary file is a common method in the art, its description will be omitted herein.

The RDVA system of the present invention will be described hereinafter in conjunction with FIGS. 2 and 3.

Figure 2:
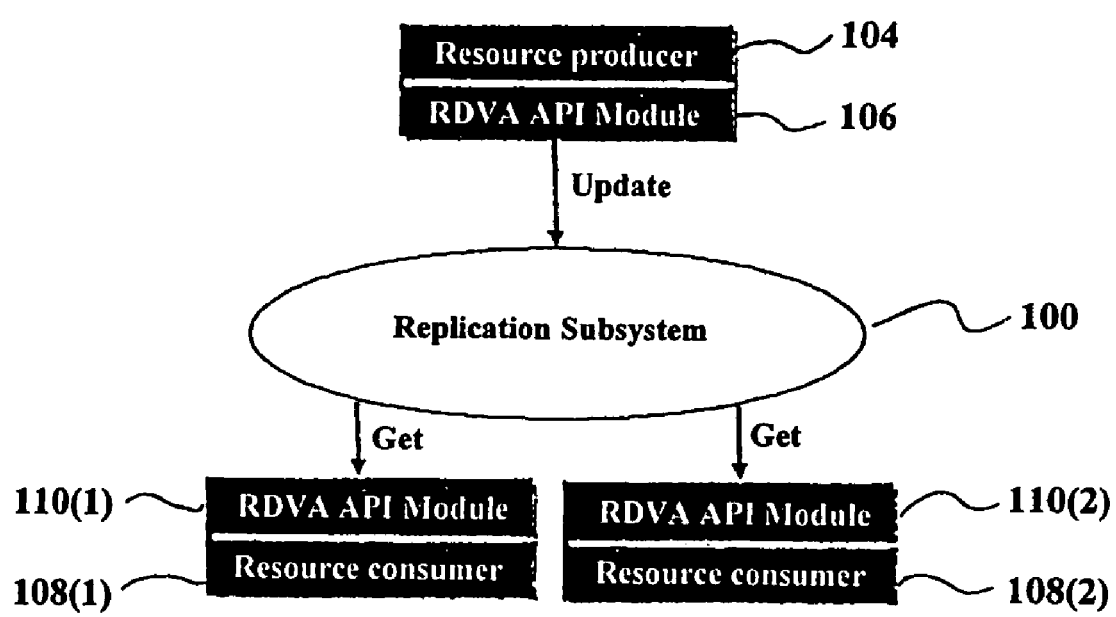
FIG. 2 is a schematic diagram of a function of a replication subsystem of the present invention.

FIG. 2 is a schematic diagram of the function of a replication subsystem of the present invention. As shown in FIG. 2, the RDVA system relies on the replication subsystem 100 to distribute the resource 206, the resource plug-in 204 and the resource patch 202. The RDVA system can include a plurality of resource producers 104 (only one is shown in FIG. 2) and a plurality of resource consumers 108 (only two are shown in FIG. 2). The RDVA API module 106 and 110 provide a friendly programming language interface for the resource producer 104 and the resource consumer 108. The resource producer 104 implements the interface to the replication subsystem 100 by the RDVA API module 106, wherein the RDVA API (RDVA application programming interface) module 106 is used to register the resource 206 and the resource plug-in 204 with the replication subsystem 100, and submit the resource patch 202 when a resource update occurs, and it can automatically execute the code of the resource plug-in 104 upon the request of the resource producer 104.

Resource producers 108(1) and (2) implement the interface to the replication subsystem 100 by the RDVA API module 110(1) and (2), wherein RDVA API module 110 is used to request the RDVA replication subsystem 100 for the resource 206 and the resource plug-in 204, access the RDVA replication subsystem 100 when there is a resource patch 202 for updating the resource 206, and automatically execute the code of the resource plug-in 104 upon the request of the resource producer 104.

Figure 3:
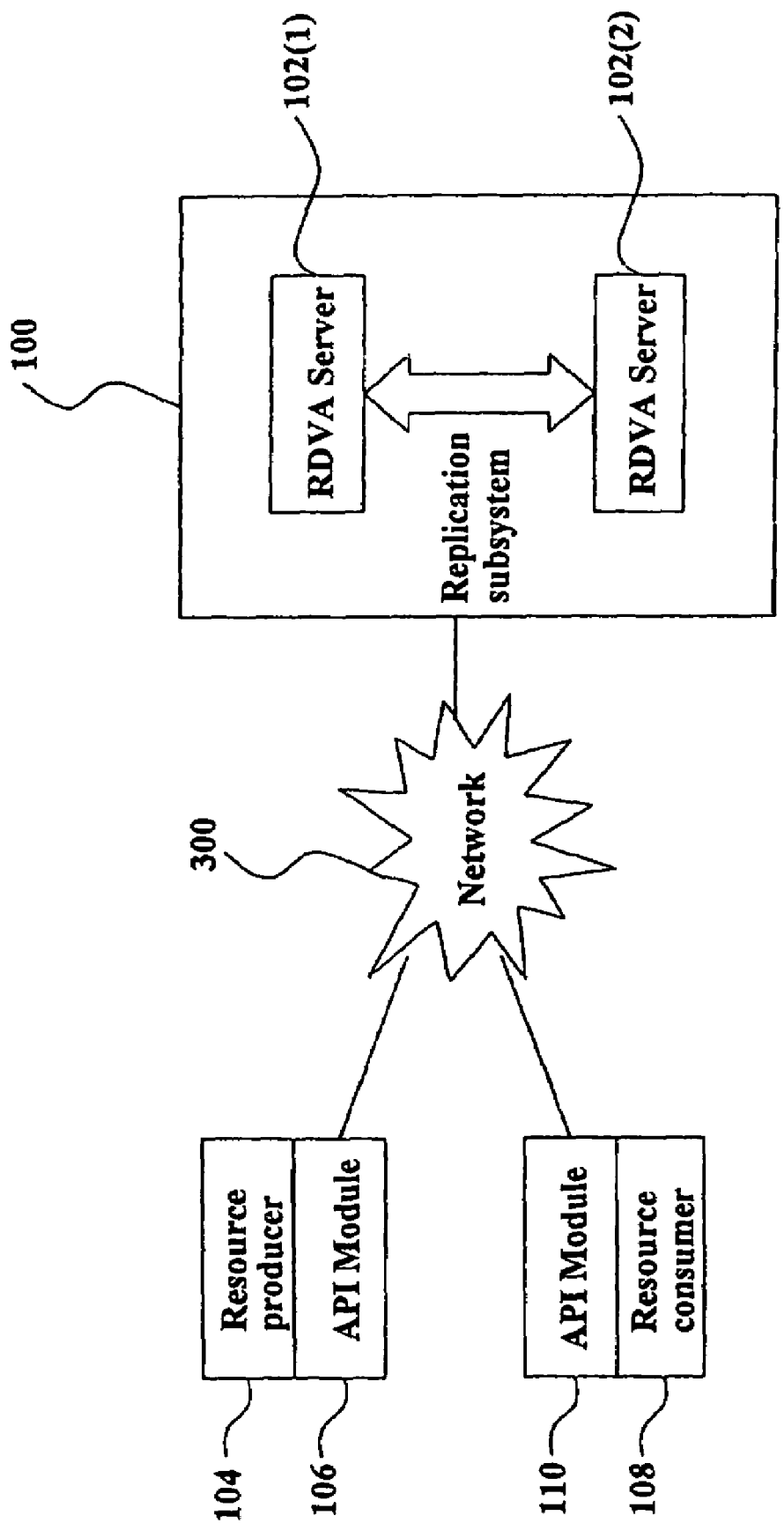
FIG. 3 is a block diagram explaining a system of the present invention.

FIG. 3 is a block diagram explaining the system of the present invention. As shown in FIG. 3, the system of the present invention comprises: the replication subsystem 100, the API module 100 for producer 104, and API module 110 for consumer 108, which are connected through the network 300. The above replication subsystem 100 comprises a RDVA server 102(1) and a RDVA server 102(2), wherein the RDVA servers 102(1) and (2) can be computers connected through a network. The RDVA servers embodies their functionality as network services. Network 300 can be any one of all kinds of networks in the art, such as LANs, enterprise networks, and various WANs (e.g. Internet, etc.)

As can be seen in FIG. 3, the replication subsystem 100 comprises a plurality of RDVA servers 102 which replicate resources between each other (only two servers (1) and (2) are shown in FIG. 2). The RDVA server 102(1) receives all initially registered resources 206, resource plug-ins 204 and all resource patches 202, and records them in its own resource database (not shown). The RDVA server 102(2) is also referred to as a secondary server in the present invention, which replicates such various data as the resource 206, the resource plug-in 204 and the resource patch 202, and provides services to the resource consumer 108 directly. The replicas of various data stored by the RDVA servers 102(1) and (2) in their respective databases are actually a plurality of sets of files in their file systems.

The replication subsystem 100 can, when replicating, utilize existing replicating tools such as IBM DB2 mechanism or other kinds of replication tools.

The RDVA API (application program programming interface) module 106 (110) can automatically execute the code of the resource plug-in 204 upon the request from the resource producer 104 or the resource consumer 108. The RDVA API module 106 (110) can be configured in a interconnected desktop computer or in an application program server as a dedicated hardware, and execute the program of a resource producer or a resource consumer, and cache the code of the resource 206, the resource plug-in 204, and the latest revision number of the resource 206 in its cache memory 112.

RDVA API module 106 working together with the resource producer 104 registers the resource 206 and the resource plug-in 204 to RDVA server 102(1) by the request from the resource producer 104, and submits the resource patch 202 to the RDVA server 102(1).

When registering the resource 206 and the resource plug-in 204 with the RDVA server 102(1), or the resource producer 104 provides the resource patch 202 to RDVA server 102(1) through RDVA API module 106, RDVA server 102(1) accepts these data and stores them in its own database (not shown). When the resource consumer 108 requests the revision of the resource 206 through RDVA API module 110, RDVA API module 110 retrieves locally the initial resource, the resource plug-in 204 or the resource patch 202. If the RDVA API module 110 does not have the above source locally, it sends a request to RDVA server 102(2). If RDVA server 102(2) does not have the above resource either, and the other servers (such as RDVA server 102(1)) have the data, RDVA server 102(2) can pull these data from RDVA server 102(1) to RDVA server 102(2). Of course, RDVA server 102(1) can also send the data to RDVA API module 110 or RDVA server 102(2) in response to their requests.

Figure 4:
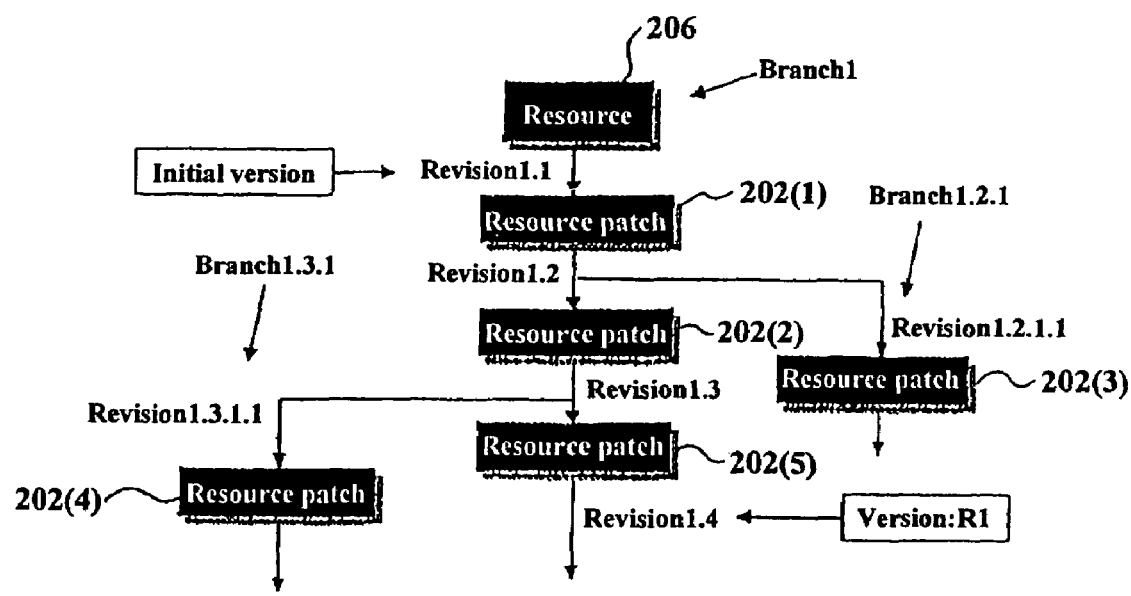
FIG. 4 shows an example of a resource revision tree structure.

The mechanism and state of resource update in the present invention will be described hereinafter in conjunction with FIGS. 4 and 5. FIG. 4 shows an example of the resource revision including three branches and two versions. As shown in FIG. 4, each resource update performed through the resource patch 202 creates a new resource revision (such as revision 1.1, revision 1.2 and etc.), which records the state of the updated resource 206. A plurality of branches of the resource revision can be created and each branch corresponds to a different resource subclass, so as to separate the states of various resource updates on various resource evolving routes. All the branches of the resource form a resource revision tree, i.e., form a tree structure indicating the state of the resource update. Resource versions are actually the naming tags for identifing a resource revision.

As shown in FIG. 4, the initial state (i.e., initial resource) of the resource 206 of the present invention forms an initial revision 1.1, which is marked up as initial version 1.1 for the public use of users. After applying the resource patch 202(1) on the initial resource revision 1.1 (e.g., changing "abbreviation IT term" in the dictionary resource), revision 1.2 is formed, and branch 1.2.1 is generated (and marked up as an initial revision 1.2.1.1 in the branch 1.2.1), and the branch 1.2.1 is used to update another subclass resource (e.g., amending of "stock term" in the dictionary resource); by applying again the resource patch 202(2) on the revision 1.2, a new revision 1.3 is generated and a new branch 1.3.1 is generated (and marked up as an initial revision 1.3.1.1 in the branch 1.3.1), and the branch 1.3.1 is used for another kind of update (i.e., amending of the "trade term" in the dictionary resource).

By applying a resource patch 202(3) on the resource revision 1.2.1.1 (e.g., amending of the "stock term" in the dictionary resource), a new revision 1.2.1.2 (not shown) is formed.

By applying a resource patch 202(4) on the resource revision 1.3.1.1 (e.g., amending of the "trade term" in the dictionary resource), a new revision 1.3.1.2 (not shown) is formed.

By again applying a resource patch 202(5) on the resource revision 1.3 (e.g., amending of "abbreviation IT term" in the dictionary resource), a new revision 1.4 is generated, which is marked up as a version 1.4 for public use of users. In the above process, various revisions other than revision 1.4 only are used as records of the update states of the resource 206 without for public use of users.

In the process of above resource update, all the revisions include metadata of the resource 206, which marks up the changed part of data in the resource 206, and also include such identification data (not shown) as revision time, version number, writer, etc. of the resource 206. In RDVA server 102(1) are stored all the revisions and versions of the resource 206 as well as the resource patch 202 and the resource plug-in 204, i.e., the entire history of revision for resource 206 is stored therein.

The above-mentioned tree structure management for the resource revision is implemented by using the classification for resources, i.e., the different resources in the dictionary resource are classified. For example, in an enterprise, different branches are established according to the utilization scope for the resource by different departments. For instance, different branches are established for financial department, law department, R&D department, marketing department and etc., respectively. Of course, the tree structure management for resource revision can also be implemented by combining the types of resources with the revision manners for resources.

Thus, different resources can be identified through different branches, and each revision on each branch marks up the state of the evolving process of that type of resource.

Figure 5:
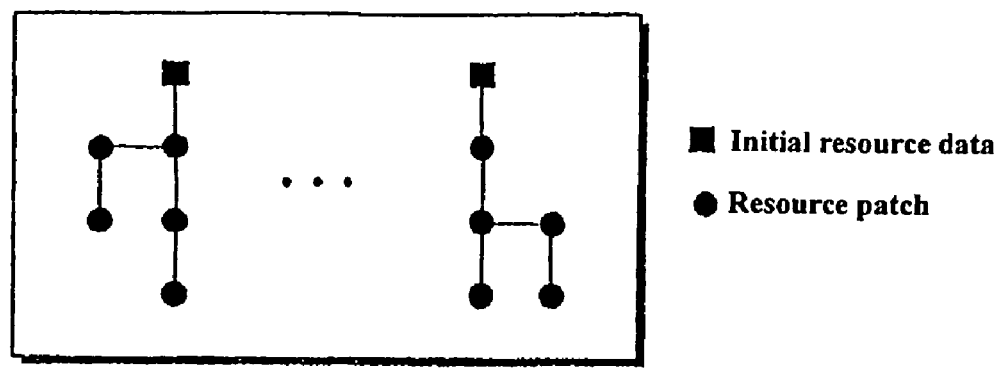
FIG. 5 is a schematic diagram illustrating a relationship state between initial resource data and resource patches.

FIG. 5 is a schematic diagram describing the relationship state between the update of the above initial resource and the resource patch, indicated in a resource database. As shown in FIG. 5, the resource database of RDVA server 102 can be regarded as a forest that consists of all the revision trees of all resources 206. The RDVA server updates the resource database by adding the resource patches 202 to appropriate tree branches. The following sections describe how the resource producers 104 register new resources 206 and submit resource patches 202 to the replication subsystem 100 as well as how the resource consumers 108 request the right version of the resources 206.

(1) Resource Registration

New resource 206 is inputted into the RDVA system of the present invention when the resource producer 104 registers the resource 206 with the replication subsystem 100. The resource producer 104 must provide initial resource data 206 in a binary block format, and provide a corresponding resource plug-in 204 in the same time. The resource plug-in 204 either refers to an existing plug-in or a newly provided one (e.g. as a jar file or dll file). After registration, the resource plug-in 204 is replicated to appropriate places in the RDVA system where need them. Here, the replication of the resource plug-in 204 is the same as that of other resources 206.

The resource producer 104 can optionally attach resource metadata 208 to the new resource. Following Java interface program shows the case that the resource producer 104 registers new resource plug-in 204 and resource 206.

```
public interface ResourceRegistration{
/**
*Register a new plugin in the RDVA system. All fields (including name,
*code type, code file and calling entry) of the plugin must not be
*<code>null</code>
```

-continued

```
*@param pluginInfo the plugin information (name, code, etc.) to be
serialized and transferred over the network to the TARR server.
*@return the plugin ID in the RDVA system.
*/
public PluginID registerNewPlugin (ResourcePluginInfo pluginInfo);
/**
*Register a new resource in the RDVA system.
*@param res the resource object, to be serialized, transferred and
registered.
*@param metadata the resource metadata, to be serialized and transferred.
*@param pluginID the ID of the previously registered plugin that this
resource will use. It must not be <code>null</code>.
*@param revNum the plugin revision that this resource will use. If it is
<code>null</code>, the latest revision on the main branch will be used.
*@return the resource ID created by the RDVA system for this new
resource.
*/
public ResourceID registerNewResource(
    Resource res,
    ResourceMetadata metadata,
    PluginID pluginID,
    RevisionNumber pluginRevNum);
}
```

(2) Resource Update

Resource update actually occurs at several places. The resource producer 104 updates the resource 206 internally, and generates the resource patch 202 that can mark up the updated content. That is, when a resource update occurs, the resource producer 104 first retrieves all the versions of the resource 206 in a local programming interface module 106, and generates new resource patch 202 on a desired version. For example, if the update is to amend "stock term" in the dictionary resource, then the resource patch 202 is generated on the basis of only the latest revision 1.2.1.1 in the branch 1.2.1, and the update for revision 1.2.1.1 is generated without updating the versions in other branches.

The update is not visible to the outside, i.e., it is unknown to other systems or components, until the update is released by submitting the resource patch 202 to the replication subsystem 100. In addition, RDVA server 102(1) in the replication subsystem 100 updates its resource database by recording the resource patch 202, and records the entire history of the update.

The resource consumer 108 can read the resource patch 202 from RDVA server 102(2) in the replication subsystem 100, and apply each resource patch 202 to its local resource 206 by using the resource plug-in 204, so as to achieve the aspect of updating resources (as mentioned before). For the resource consumer 108, the update is accomplished by the RDVA API module 110. Furthermore, the RDVA API module 110 also stores the updated resource version.

Note that only at resource consumer 108 side, the resource patch 202 is actually applied to the originally existed resource 206. In RDVA servers 102(1) and (2) side, the resource patch 202 is only recorded. The RDVA servers 102(1) and (2) keep a resource database (not shown) that records all data of the initially registered resources 206 and all the resource patches 202 that are received. As shown in FIG. 4, the history of the resource 206's update is actually a resource revision tree consisting of data of the initial resource 206 and all the resource patches 202.

Figure 6:
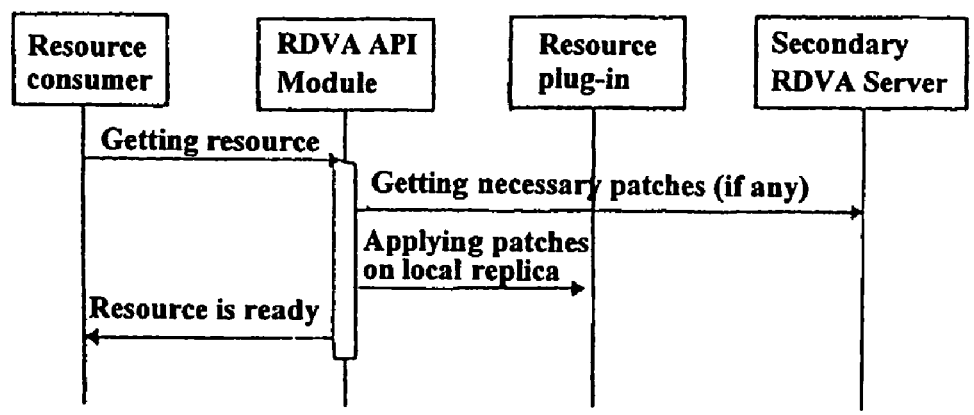
FIG. 6 shows a timing diagram of a operation executed between a resource consumer, an RDVA API module, a resource plug-in and a secondary server.

The process of obtaining resources at the resource consumer 108 will be described hereinafter in conjunction with FIG. 6. FIG. 6 shows a process that the resource consumer 108 obtains necessary resources through RDVA API module 110 and RDVA server 102(2) (secondary server) and applies them to a local resource 206. As shown in FIG. 6, because the resource consumer 108 needs to read the complete data of the resource 206 when using the resource 206, it must apply the resource patch 202 on its existing resource 206 to obtain the latest version of the complete resource 206. The resource consumer 108 retrieves locally any version and/or revision data of the resource 206, or the latest data of certain branches of the resource 206, via RDVA API module 110. RDVA API module 110 maintains a cache memory (not shown) storing resource data therein for the resource consumer 108, and checks the latest revision of the resource 206 that is requested in the cache memory. Then, API module 110 obtains necessary resource patches 202 from RDVA server 102(2), and applies these resource patches 202 on the latest revision of the resource 206, so as to obtain the latest complete resource 206. Note that the application of the resource patch 202 is accomplished by the resource plug-in 204. Finally, RDVA API module 110 returns the latest complete resource 206 as a local file back to the resource consumer 108 for use.

Figure 7:
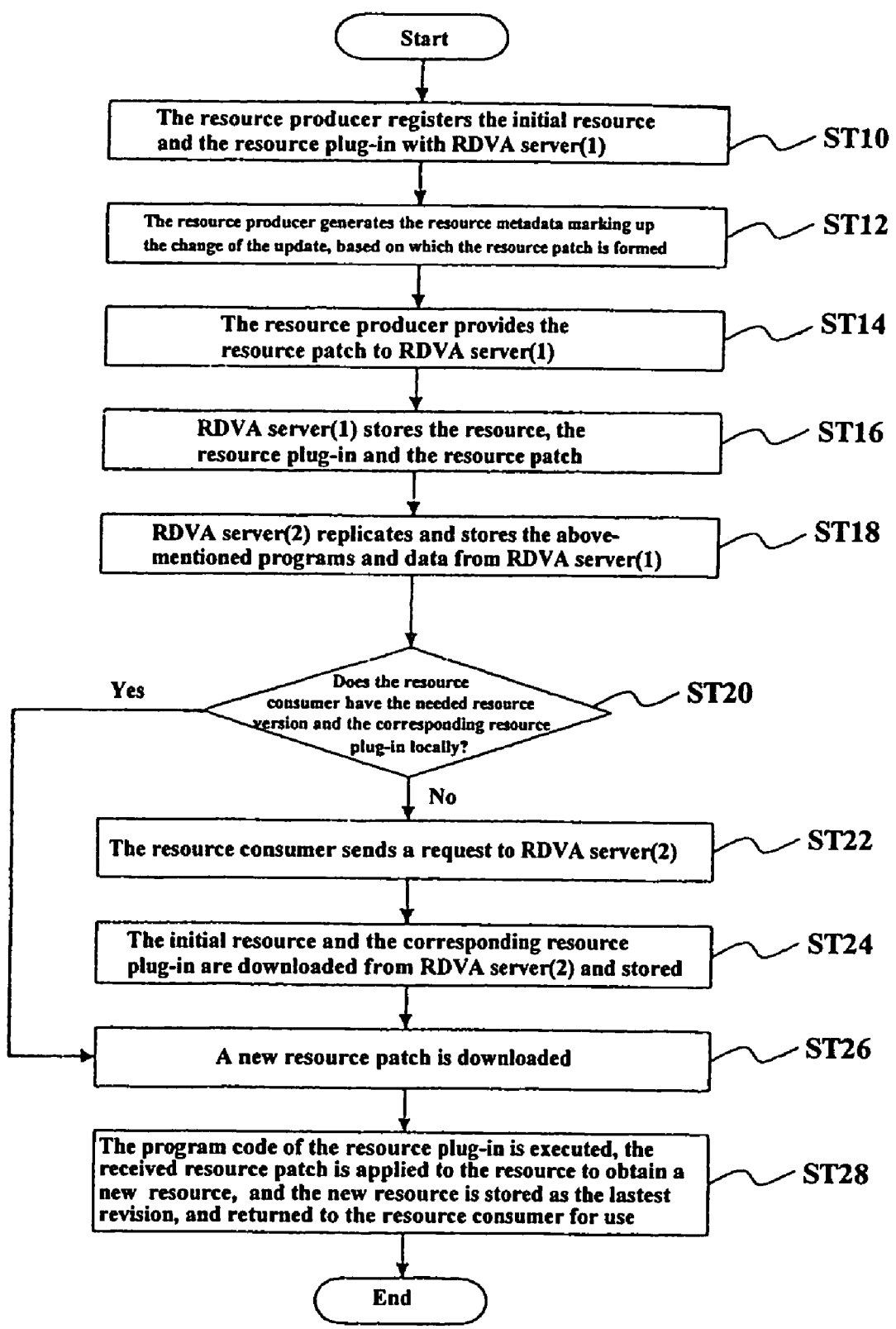
FIG. 7 is a work flow chart explaining an RDVA system of the present invention.

The operational process of RDVA system of the present invention will be described in conjunction with FIG. 7. FIG. 7 is a flow chart explaining the operation of RDVA system of the present invention. As shown in FIG. 7, at step ST10, in case that there is no resource 206 in RDVA servers 102(1) and (2), the resource producer 104 registers an initial resource 206 and a resource plug-in 204 with the RDVA server 102(1) through its local RDVA API module 106, and the initial resource 206 is provided as a binary data block. In case that there is an existing resource plug-in in RDVA server 102(1), the resource plug-in 204 can also be the existing resource plug-in in RDVA server 102(1).

At step ST12, when needing to update the resource 206 provided by the resource producer 104, the resource producer 104 retrieves locally any versions and/or revision data of the resource 206 via RDVA API module 106, based on which resource metadata 208 marking up the change of the update is generated, and the resource patch 202 is formed by using resource metadata 208. Then, at step ST14, the resource producer 104 provides the resource patch 202 to RDVA server 102(1) through its local RDVA API module 106, which is related to the resource 206 and the revision thereof.

Next at step ST16, RDVA server 102(1) stores the resource 206, the resource plug-in 204 and the resource patch 202 in a local database (not shown). The resource plug-in 204 and the resource patch 202 are also treated as resources. At step ST18, RDVA server 102(2) replicates the above-mentioned programs and data from RDVA server 102(1) and stores them, or RDVA server 102(1) on its own initiative transfers the above resource 206, resource plug-in 204 and resource patch 202 to RDVA server 102(2).

At step ST20, when needing to use the resource 206, RDVA API module 110 of the resource consumer 108 first checks whether the needed resource 206 and corresponding resource plug-in 204 exist in the local cache memory.

If it is determined that there is no corresponding version of the needed resource 206 and the resource plug-in 204, the process proceeds to step ST22. At step ST22, the resource consumer 108 requests a certain revision of the resource 206 or the latest data of the resource 206 from RDVA server 102(2).

At step ST24, RDVA API module 110 downloads initial resource 206 and corresponding resource plug-in 204 from RDVA server 102(2) and stores them in the cache memory.

Next at step ST26, RDVA API module 110 checks the latest revision of the requested resource in the local cache memory, and if a new resource patch 202 is found in RDVA server 102(2), then the new resource patch 202 is obtained from RDVA server 102(2). If there is no new resource patch 202 in RDVA server 102(2), RDVA server 102(2) needs to replicate the data from other servers (such as RDVA server 102(1)).

If the determination result at step ST20 is that corresponding version of the needed resource 206 and the resource plug-in 204 can be found locally, then the process proceeds to step ST26, and performs the process in ST26.

Then at step ST28, RDVA API module 110, by executing the program code of the resource plug-in 204, applies the received resource patch 202 on the latest revision of the resource 206, i.e., performs update calculation in terms of the latest revision of the resource 206 according to the content information recorded in the resource patch 202, so as to obtain a new resource 206. RDVA API module 110 stores the new resource 206 as the latest revision, and returns it to the resource consumer 108 for processing data (such as marking up keywords in a markup text) or accomplishing a special task (dialing up a computer network).

The system of the present invention is easy for development and deployment. The update of data/resources is implemented by the resource plug-in using the incremental update algorithm and applying the resource patch on the resource. User needs only to specify the roles of resource producers and resource consumers: resource producers just need to register the resource and update the resource by patches; resource consumers just need to subscribe to certain resources to receive the updates. Therefore, only a small quantity of resource patches need to be transmitted through a network. This will greatly save network bandwidth in large scale progressive resource distribution. Since all resources share the same channel, it results in lower costs.

The present invention can perform a finer control on the version update of progressively evolving heterogeneous resource by effectively integrating the resource reduplication and the version updating control, that is, classify the resource according to the category thereof, and generate resource patches for every classified resource version. Thus for a minute update change, only a smaller resource patch is needed to solve the problem without performing a complete process and transmission of the entire resource, thereby capable of saving a lot of network bandwidth and the load of servers.

The system of the present invention has a secondary server for distributing resources, thereby making the design more flexible and extensible, and making the load of the main server in the system lessened.

While embodiments of the present invention are described in detail above, it will be understood by those skilled in the art that various modifications according to the spirit and teaching of the present invention fall into the scope sought for protection by the appended claims of the present invention. The method and system of the present invention will greatly save network bandwidth in a large scale progressive resource distribution and make the design more flexible and extensible.

Thus, the present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent aspects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method for distributing and updating resources, wherein said method comprising the steps of:

a resource producer registering a resource and a resource plug-in with a first server, and submitting a resource patch thereto when a resource update occurs;

a second server replicating the resource, the resource plug-in and the resource patch from the first server, and a resource consumer downloading the resource, the resource plug-in and the resource patch from the second server; and updating the resource at the resource consumer side by executing the resource plug-in to apply the resource patch on the resource, and obtaining an updated resource version, wherein only the resource consumer applies the resource patch on the resource and has the updated resource, the first server and the second server keeping a resource database that records all data of the registered resource and the resource patch.

2. The method according to claim 1, wherein if the first server stores a resource plug-in previously, then this previously stored resource plug-in is used.

3. The method according to claim 1, wherein said resource plug-in is a computer program module implementing a programming interface.

4. The method according to claim 1, wherein the resource and the resource plug-in are registered and the resource patch is submitted to the first server in the form of binary code.

5. The method according to claim 1, wherein the resource is various digital data that are frequently used and evolve slowly, including a dictionary, a catalogue, a name list and a directory.

6. The method according to claim 1, wherein the resource patch is a program module representing the change of the resource, and includes resource metadata for identifying the change of the resource.

7. The method according to claim 6, wherein the resource patch is related to the version of the resource that has a corresponding resource version number, and one resource version number represents that the resource is updated once.

8. The method according to claim 7, wherein the version of the resource is managed in a tree structure according to the category of the resource, one branch of the tree structure represents one kind of resource.

9. The method according to claim 7, wherein the types of the update include the adding, deleting or changing of the resource.

10. The method according to claim 7, wherein when a resource update occurs, each version of the resource is first retrieved, and a new resource patch is generated based on a specific version.

11. The method according to claim 1, further comprising the step of: storing the updated resource version by a programming interface module.

12. A computer-implemented method for distributing and updating heterogeneous resources, comprising the steps of:
   a resource producer registering a resource and a resource plug-in with a first server, and submitting a resource patch thereto;
   the first server storing the resource, the resource plug-in and the resource patch;
   a second sever replicating the resource, the resource plug-in and the resource patch from the first sever;
   if there is not the needed resource and the corresponding resource plug-in at a resource consumer side, the resource consumer requesting and downloading the resource, resource plug-in and resource patch from the second server;
   applying the received resource patch on the resource by executing the resource plug-in, so as to obtain the updated resource; and
   at the resource consumer side, storing the updated resource as the latest revision for the use of the resource consumer,
   wherein only the resource consumer applies the resource patch on the resource and has the updated resource, the first server and the second server keeping a resource database that records all data of the registered resource and the resource patch.

13. The method according to claim 12, wherein there can be a plurality of resource producers, resource consumers, first servers and second servers.

14. A system for distributing and updating resources, comprising:
   a processor;
   a first programming interface module for generating, by a resource producer, a resource and a resource plug-in, and when a resource update occurs, generating a resource patch;
   a second programming interface module for updating the resource by executing the resource plug-in to apply the resource patch on the resource by a resource consumer, so as to obtain an updated resource version; and
   a replication subsystem for receiving the resource, the resource plug-in and the resource patch from the first programming interface module, storing them and providing them to the second programming interface module,
   wherein only the resource consumer applies the resource patch on the resource and has the updated resource, the replication subsystem keeping a resource database that records all data of the registered resource and the resource patch.

15. The system according to claim 14, wherein the replication subsystem comprises:
   a first server for receiving the resource, the resource plug-in and the resource patch from the first programming interface module, and storing them; and
   a second server for replicating the resource, the resource plug-in and the resource patch from the first programming interface module, storing them and providing them to the second programming interface module.

16. The system according to claim 14, wherein the resource plug-in is a computer program module implementing a programming interface.

17. The system according to claim 14, wherein the resource patch is a program module representing the change of the resource, and includes resource metadata for identifying the change of the resource.

18. The system according to claim 17, wherein the resource patch is related to the version of the resource that has a corresponding resource version number, and one resource version number represents that the resource is updated once.

19. The system according to claim 14, wherein the resource and the resource plug-in are registered with, and the resource patch is submitted to the first server, in the form of binary code.

20. The system according to claim 15, wherein there can be a plurality of first programming interface module, second programming interface module, first servers and second servers.

21. An article of manufacture comprising a computer usable medium having computer readable program code means embodied therein for causing distribution and updating of resources, the computer readable program code means in said article of manufacture comprising computer readable program code means for causing a computer to effect the steps of:
   a resource producer registering a resource and a resource plug-in with a first server, and submitting a resource patch thereto when a resource update occurs;
   a second server replicating the resource, the resource plug-in and the resource patch from the first server, and a resource consumer downloading the resource, the resource plug-in and the resource patch from the second server; and
   updating the resource at the resource consumer side by executing the resource plug-in to apply the resource patch on the resource, and obtaining an updated resource version,
   wherein only the resource consumer applies the resource patch on the resource and has the updated resource, the first server and the second server keeping a resource database that records all data of the registered resource and the resource patch.

22. An article of manufacture comprising a computer usable medium having computer readable program code means embodied therein for causing distribution and updating of heterogeneous resources, the computer readable program code means in said article of manufacture comprising computer readable program code means for causing a computer to effect the steps of:
   a resource producer registering a resource and a resource plug-in with a first server, and submitting a resource patch thereto;
   the first server storing the resource, the resource plug-in and the resource patch; a second sever replicating the resource, the resource plug-in and the resource patch from the first sever;

if there is not the needed resource and the corresponding resource plug-in at a resource consumer side, the resource consumer requesting and downloading the resource, resource plug-in and resource patch from the second server;

applying the received resource patch on the resource by executing the resource plug-in, so as to obtain the updated resource; and at the resource consumer side, storing the updated resource as the latest revision for the use of the resource consumer, wherein only the resource consumer applies the resource patch on the resource and has the updated resource, the first server and the second server keeping a resource database that records all data of the registered resource and the resource patch.

23. A computer program product comprising a computer usable medium having computer readable program code means embodied therein for causing distribution and updating of resources, the computer readable program code means in said computer program product comprising computer readable program code means for causing a computer to effect the functions of:

a first programming interface module for generating, by a resource producer, a resource and a resource plug-in, and when a resource update occurs, generating a resource patch;

a second programming interface module for updating the resource by executing the resource plug-in to apply the resource patch on the resource by a resource consumer, so as to obtain an updated resource version; and a replication subsystem for receiving the resource, the resource plug-in and the resource patch from the first programming interface module, storing them and providing them to the second programming interface module, wherein only the resource consumer applies the resource patch on the resource and has the updated resource, the replication subsystem keeping a resource database that records all data of the registered resource and the resource patch.

24. A computer program product as recited in claim 23, the computer readable program code means in said computer program product further comprising computer readable program code means for causing a computer to effect the functions of:

a first server for receiving the resource, the resource plug-in and the resource patch from the first programming interface module, and storing them; and a second server for replicating the resource, the resource plug-in and the resource patch from the first programming interface module, storing them and providing them to the second programming interface module.

* * * * *